C. M. WILLIAMS.
Can-Opener.
No. 224,977. Patented Feb. 24, 1880.
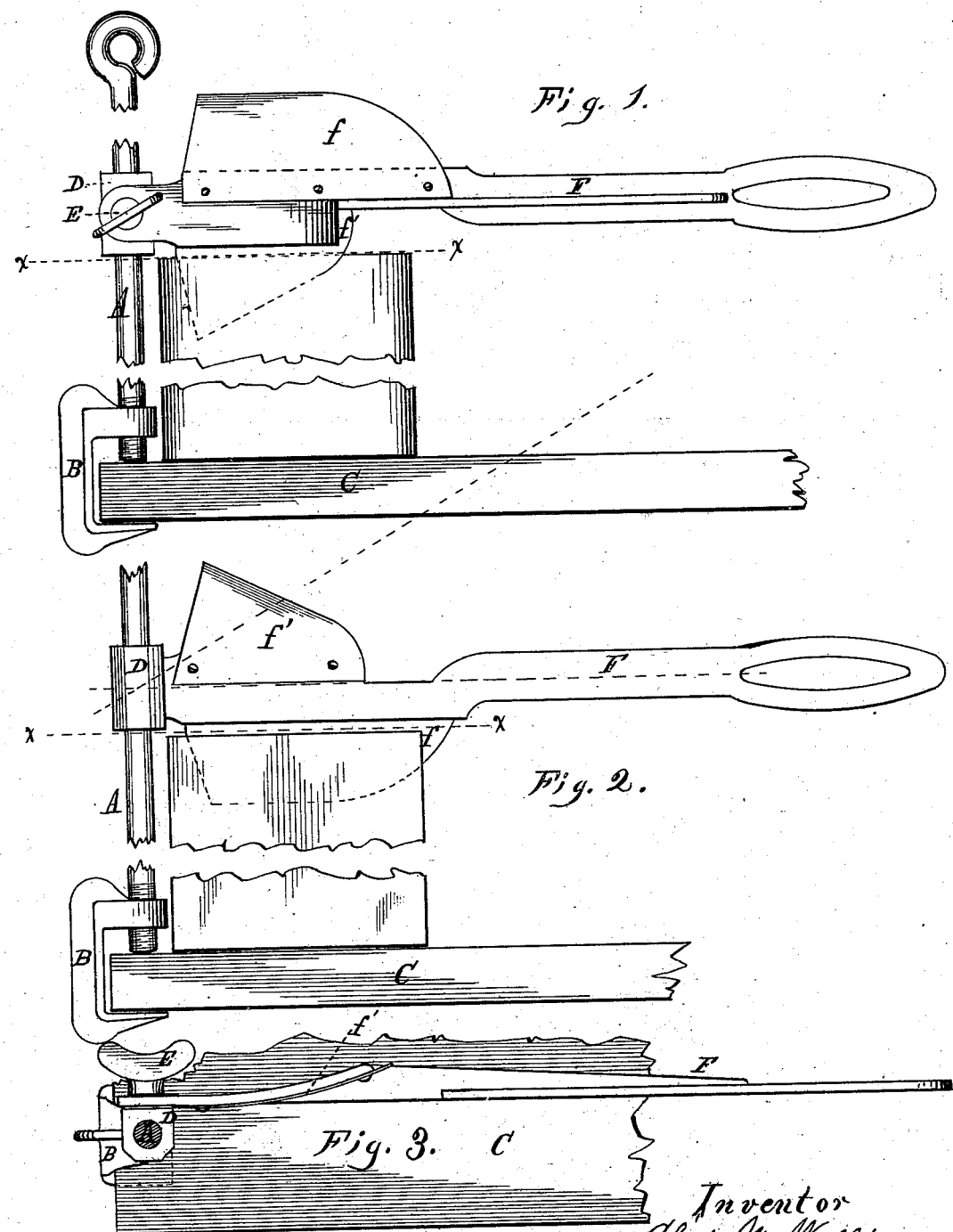

UNITED STATES PATENT OFFICE.

CHARLES M. WILLIAMS, OF BETHEL, KENTUCKY.

CAN-OPENER.

SPECIFICATION forming part of Letters Patent No. 224,977, dated February 24, 1880.

Application filed September 25, 1879.

*To all whom it may concern:*

Be it known that I, CHARLES M. WILLIAMS, of Bethel, county of Bath, and State of Kentucky, have invented a new and Improved Can-Opener; and I do hereby declare that the following is a full, clear, and exact description of the same, reference being had to the annexed drawings, making a part of this specification.

Figure 1 is a side elevation, showing the curved knife operating on a round can. Fig. 2 is a side elevation, showing the knives reversed and the straight knife operating on a straight-sided can; and Fig. 3 is a plan of Fig. 2.

The nature of my invention relates to a new and improved utensil for opening cans of various shapes and sizes, such as usually contain fruit, oysters, ink, paint, &c.

It consists, mainly, of a vertical standard of round iron fastening itself to a table by being screwed through a suitable clamp; also, of a collar encircling said standard, which supports the fulcrum of a hand-lever carrying a curved knife on one side and a straight one on the other, all being so arranged that the lever and knives can be instantly reversed without taking any of the parts from each other.

The object of my invention is the production of a can-opener which will be so constructed that it can be easily and readily attached or fastened to a table or any other suitable object; that it can be adjusted so as to be used for opening cans of any ordinary height; that it can be adapted to the opening of cans whose upper surfaces are either round or straight edged; that it can be made simple, durable and strong, and cheap.

In construction my invention is as follows: A is a standard, made of round iron, which penetrates, by a screw-thread, the upper arm of clamp B, pressing on the upper surface of table C. The adjustable collar D moves freely over standard A, and is held in any position desired by the thumb-screw E. The lever F is given any suitable shape, one of which is shown in the drawings, to which the straight knife $f$ is riveted or otherwise fastened, and also the curved knife $f'$, as shown. The hand-lever F is held in position by the thumb-screw E, but is not tightened by it to the collar D, which allows the lever to have free action around the fulcrum formed by the shank of screw E.

The dotted line $x$ shows the height of the can and the proper adjusting-point for the collar.

The operation of my invention is as follows: The clamp is placed over the edge of a table and the standard is screwed down until the device is made secure. If a round can is to be opened, the curved knife $f'$ is placed below, as seen in Fig. 1. The handle is raised sufficiently high to bring the point of the operating-knife above line $x$. The collar is raised also to line $x$, and the thumb-screw E is there tightened. The can is then placed under the knife, which is forced into the can by means of lever F, the can being turned at each stroke, thus cutting a hole of round form of any desired diameter; or the entire head of the can may be cut out close to the edge.

Should a straight-sided can—such as is used to hold oysters, &c.—be presented for opening, the thumb-screw E is loosened, the lever is raised and vertically turned past the standard A until it occupies a similar position on the opposite side, and then is horizontally swung around to the position it first held, thus bringing the straight knife under the lever-arm and ready for cutting, as shown in Fig. 2.

The same rule is followed as to adjusting the collar, and the cutting operation is substantially the same, making any rectangular cut desired.

Having thus described my invention, what I claim as new, and desire to secure by Letters Patent, is—

1. In a can-opener, the combination, with the thumb-screw E, collar D, and standard A, of the lever F, having the straight knife $f$ and curved knife $f'$, substantially as described, all constructed and arranged to operate substantially as and for the purposes set forth.

2. A can-opener wherein are combined the lever F, knives $f$ and $f'$, thumb-screw E, collar D, standard A, and clamp B, all constructed substantially as described and shown.

CHARLES M. WILLIAMS.

Attest:
T. VAN KANNEL,
WALTER S. MOSER.